(12) United States Patent
Moon et al.

(10) Patent No.: US 12,608,604 B2
(45) Date of Patent: Apr. 21, 2026

(54) METHOD AND APPARATUS FOR TRAINING ARTIFICIAL INTELLIGENCE BASED ON EPISODE MEMORY

(71) Applicant: ELECTRONICS AND TELECOMMUNICATIONS RESEARCH INSTITUTE, Daejeon (KR)

(72) Inventors: Ye Bin Moon, Daejeon (KR); Tae Hyun Oh, Daejeon (KR); Yong Jin Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 972 days.

(21) Appl. No.: 17/533,679

(22) Filed: Nov. 23, 2021

(65) Prior Publication Data

US 2023/0041614 A1      Feb. 9, 2023

(30) Foreign Application Priority Data

Aug. 9, 2021      (KR) ........................ 10-2021-0104631

(51) Int. Cl.
| | |
|---|---|
| *G06N 3/08* | (2023.01) |
| *G06F 18/10* | (2023.01) |
| *G06F 18/22* | (2023.01) |

(52) U.S. Cl.
CPC .............. *G06N 3/08* (2013.01); *G06F 18/10* (2023.01); *G06F 18/22* (2023.01)

(58) Field of Classification Search
CPC ........ G06N 3/08; G06N 3/0464; G06N 3/084; G06N 3/0895; G06N 3/096; G06N 3/0455;

(Continued)

(56) References Cited

U.S. PATENT DOCUMENTS

| | | | |
|---|---|---|---|
| 10,963,754 B1 | 3/2021 | Ravichandran et al. | |
| 2019/0303764 A1* | 10/2019 | Uria-Martínez | ......... G06N 3/08 |

(Continued)

FOREIGN PATENT DOCUMENTS

| | | |
|---|---|---|
| JP | 2005078516 | 3/2005 |
| KR | 10-2020-0057832 | 5/2020 |

(Continued)

OTHER PUBLICATIONS

Inflated Episodic Memory With Region Self-Attention for Long-Tailed Visual Recognition, Linchao Zhu et al., 2020 IEEE/CVF Conference on Computer Vision and Pattern Recognition (Year: 2020).*

(Continued)

*Primary Examiner* — Miranda M Huang
*Assistant Examiner* — Yao David Huang
(74) *Attorney, Agent, or Firm* — KILE PARK REED & HOUTTEMAN PLLC

(57)      ABSTRACT

The present disclosure relates to a method and apparatus for training artificial intelligence based on an episodic memory. According to an embodiment of the present disclosure, a method for training artificial intelligence based on an episodic memory may include: constructing an episodic memory by using a feature vector of a training dataset stored in a full memory; obtaining output data by inputting query data into an artificial intelligence model; deriving a similarity between the output data and a feature vector in the constructed episodic memory; and deriving an episode loss function based on the similarity.

17 Claims, 7 Drawing Sheets

(58) Field of Classification Search

CPC ........ G06N 20/20; G06N 3/045; G06N 3/063;
G06N 7/01; G06N 3/088; G06F 18/10;
G06F 18/22

See application file for complete search history.

(56) References Cited

U.S. PATENT DOCUMENTS

| | | | |
|---|---|---|---|
| 2020/0134385 A1* | 4/2020 | Yin | G06F 18/217 |
| 2020/0160212 A1 | 5/2020 | Shin et al. | |
| 2020/0257970 A1 | 8/2020 | Moon et al. | |
| 2020/0372350 A1 | 11/2020 | Cho et al. | |
| 2021/0103721 A1 | 4/2021 | Im et al. | |
| 2021/0124993 A1 | 4/2021 | Singh et al. | |
| 2021/0142164 A1* | 5/2021 | Liu | G06F 40/216 |
| 2021/0263859 A1* | 8/2021 | Hwang | G06F 40/30 |
| 2021/0383226 A1* | 12/2021 | Doersch | G06N 3/045 |

FOREIGN PATENT DOCUMENTS

| | | |
|---|---|---|
| KR | 10-2020-0063330 | 6/2020 |
| KR | 10-2020-0097618 | 8/2020 |
| KR | 10-2021-0052153 | 5/2021 |
| WO | 2021/085785 | 5/2021 |

OTHER PUBLICATIONS

Memory Matching Networks for One Shot Image Recognition, Qi Cai et al., arXiv:1804.08281v1 [cs.CV] Apr. 23, 2018 (Year: 2018).*

Matching Networks for One Shot Learning, Oriol Vinyals et al., arXiv:1606.04080v2 [cs.LG] Dec. 29, 2017 (Year: 2017).*

Multi-Loss Function Fusion for Face Recognition Based on the Convolutional Neural Network, Qing Gao et al., 2019 12th International Congress on Image and Signal Processing, BioMedical Engineering and Informatics (Year: 2019).*

ReasoNet: Learning to Stop Reading in Machine Comprehension, Yelong Shen et al., arXiv:1609.05284v3 [cs.LG] Jun. 20, 2017 (Year: 2017).*

Deep Episodic Memory Encoding, Recalling, and Predicting Episodic Experiences for Robot Action Execution, Jonas Rothfuss et al., IEEE Robotics and Automation Letters, vol. 3, No. 4, Oct. 2018 (Year: 2018).*

Rebuffi et al., "iCaRL: Incremental Classifier and Representation Learning," arXiv:1611.07725v2 [cs.CV] Apr. 14, 2017 (Year: 2017).*

Choi et al., "Autoencoder-Based Incremental Class Learning without Retraining on Old Data," arXiv:1907.07872v1 [cs.LG] Jul. 18, 2019 (Year: 2019).*

Lin et al., "Episodic Memory Deep Q-Networks," arXiv:1805.07603v1 [cs.LG] May 19, 2018 (Year: 2018).*

Chaudhry et al., "On Tiny Episodic Memories in Continual Learning," arXiv:1902.10486v4 [cs.LG] Jun. 4, 2019 (Year: 2019).*

Ye-Bin Moon et al., "Self-supervised Few-shot Learning by Episodic Instance Discrimination", IPIU 2021, 33rd Image Processing and Image Understanding, Feb. 3-5, 2021.

* cited by examiner

START

CONSTRUCT EPISODIC MEMORY BY USING
FEATURE VECTOR OF TRAINING
DATASET STORED IN FULL MEMORY — S401

OBTAIN OUTPUT DATA BY
INPUTTING QUERY DATA INTO
ARTIFICIAL INTELLIGENCE MODEL — S402

DERIVE SIMILARITY BETWEEN OUTPUT
DATA AND FEATURE VECTOR IN
CONSTRUCTED EPISODIC MEMORY — S403

DERIVE EPISODE LOSS FUNCTION
BASED ON SIMILARITY — S404

END

METHOD AND APPARATUS FOR TRAINING ARTIFICIAL INTELLIGENCE BASED ON EPISODE MEMORY

CROSS REFERENCE TO RELATED APPLICATION

The present application claims priority to KR application 10-2021-0104631, filed Aug. 9, 2021, the entire contents of which are incorporated herein for all purposes by this reference.

BACKGROUND OF THE INVENTION

Field of the Invention

The present disclosure relates to a method and apparatus for training artificial intelligence based on an episodic memory and, more particularly, to a technique for enabling an artificial intelligence model to perform a task for a new class, for which the model has not been trained, without a further learning process.

Description of the Related Art

Artificial intelligence technology is rising up in recent years. As artificial intelligence technology spreads and penetrates at an alarming pace into various areas such as recognition/judgment systems of self-driving cars, traffic, the press, logistics, safety and environment, this technology is recognized as a new source of added value, that is, a new growth engine of the industry of human-centered values and a knowledge information society. In order to train artificial intelligence to show performance at a level similar to or higher than human ability, a technology of analyzing a massive amount of data has been proposed which uses various types of deep neural networks in the field of artificial intelligence.

However, the current deep neural network (DNN) technology can obtain a human-level accuracy of inference only by learning hundreds to tens of thousands of example datasets. To this end, a work of describing accurate class labels for each of numerous example datasets is inevitably required, which causes very large visual and economic costs. In addition, when a same task is to be performed for a new class that has not been used for training, an existing DNN needs to be trained again with a lot of data of the new class. Such inconvenience should be mitigated by developing a more efficient artificial intelligence (AI) training technique.

SUMMARY

In order to solve a problem of a related art, the present disclosure is directed to provide a method and apparatus for training artificial intelligence based on episodic memory.

Also, the present disclosure is directed to provide a technique of training artificial intelligence that enables an artificial intelligence model to perform a task for a new class, for which the model has not been trained, without a further learning process.

Also, the present disclosure is directed to provide a technique of training an artificial intelligence model using a small number of training datasets without class labels.

Other objects and advantages of the present disclosure will become apparent from the description below and will be clearly understood through embodiments of the present disclosure. Also, it will be easily understood that the objects and advantages of the present disclosure may be realized by means of the appended claims and a combination thereof.

According to an embodiment of the present disclosure, a method for training artificial intelligence based on an episodic memory may include: constructing an episodic memory by using a feature vector of a training dataset stored in a full memory; obtaining output data by inputting query data into an artificial intelligence model; deriving a similarity between the output data and a feature vector in the constructed episodic memory; and deriving an episode loss function based on the similarity.

Meanwhile, the episodic memory may include an index in the full memory for a feature vector included in the episodic memory and a matrix representation of the feature vector.

Meanwhile, the episode loss function may be derived based on at least one of a hard-attention loss function and a soft-attention loss function.

Meanwhile, the hard-attention loss function may be derived based on a probability that an arbitrary slot in the episodic memory corresponds to the query data.

Meanwhile, when the arbitrary slot in the episodic memory corresponds to the query data, the soft-attention loss function may be derived based on a difference between the output data that are obtained through the artificial intelligence model by using a probability that another arbitrary slot in the episodic memory corresponds to the query data.

Meanwhile, the artificial intelligence model may include a first artificial intelligence model and a second artificial intelligence model, and the second artificial intelligence model may be a teacher model that forwards intrinsic knowledge to the first artificial intelligence model through knowledge distillation.

Meanwhile, the second artificial intelligence model may include a pretrained artificial neural network.

Meanwhile, the pretrained artificial neural network may be based on a convolutional neural network (CNN).

Meanwhile, the second artificial intelligence model may include a pretrained artificial neural network that performs a same type of task as the first artificial intelligence model.

Meanwhile, deriving a knowledge distillation loss function by using the second artificial intelligence model may further be included.

Meanwhile, deriving a final loss function by applying a weight to the episode loss function and the knowledge distillation loss function may further be included.

Meanwhile, the artificial intelligence model may be based on a convolutional neural network (CNN) or an autoencoder.

Meanwhile, the full memory may store a class label corresponding to the feature vector.

Meanwhile, a class label of a feature vector with a highest similarity may be allocated as a class label of the query data.

Meanwhile, a feature vector of the training data may be stored in the full memory and be updated at a predetermined interval.

Meanwhile, the training dataset may include the query data and random data.

Meanwhile, a plurality of the query data may form mini batch.

According to an embodiment of the present disclosure, an apparatus for training artificial intelligence based on an episodic memory may include a memory constructed to store a feature vector of a training dataset and a processor constructed to control the memory, wherein the processor is further configured to: construct an episodic memory by using a feature vector of training data stored in a full memory, obtain output data by inputting query data into an artificial intelligence model, derive a similarity between the output data and a feature vector in the constructed episodic memory, and derive an episode loss function based on the similarity.

Meanwhile, the episodic memory may include an index in the full memory for a feature vector included in the episodic memory and a matrix representation of the feature vector.

Meanwhile, the episode loss function may be derived based on at least one of a hard-attention loss function and a soft-attention loss function.

Meanwhile, the artificial intelligence model may include a first artificial intelligence model and a second artificial intelligence model, and the second artificial intelligence model may be a teacher model that forwards intrinsic knowledge to the first artificial intelligence model through knowledge distillation.

According to an embodiment of the present disclosure, a computer program stored in a non-transitory computer-readable medium may perform: constructing an episodic memory by using a feature vector of training data stored in a full memory; obtaining output data by inputting query data into an artificial intelligence model; deriving a similarity between the output data and a feature vector in the constructed episodic memory; and deriving an episode loss function based on the similarity.

According to the present disclosure, a method and apparatus for training artificial intelligence based on an episodic memory may be implemented.

In addition, according to the present disclosure, an artificial intelligence model may be trained by using a small number of training datasets without label.

In addition, according to the present disclosure, an artificial intelligence model may perform a task for a new class, for which the model has not been trained, without a further learning process.

In addition, according to the present disclosure, a better task performance result may be obtained in good combination with a separate technique of enabling information on a given task to be better reflected.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

DETAILED DESCRIPTION

Figure 1:
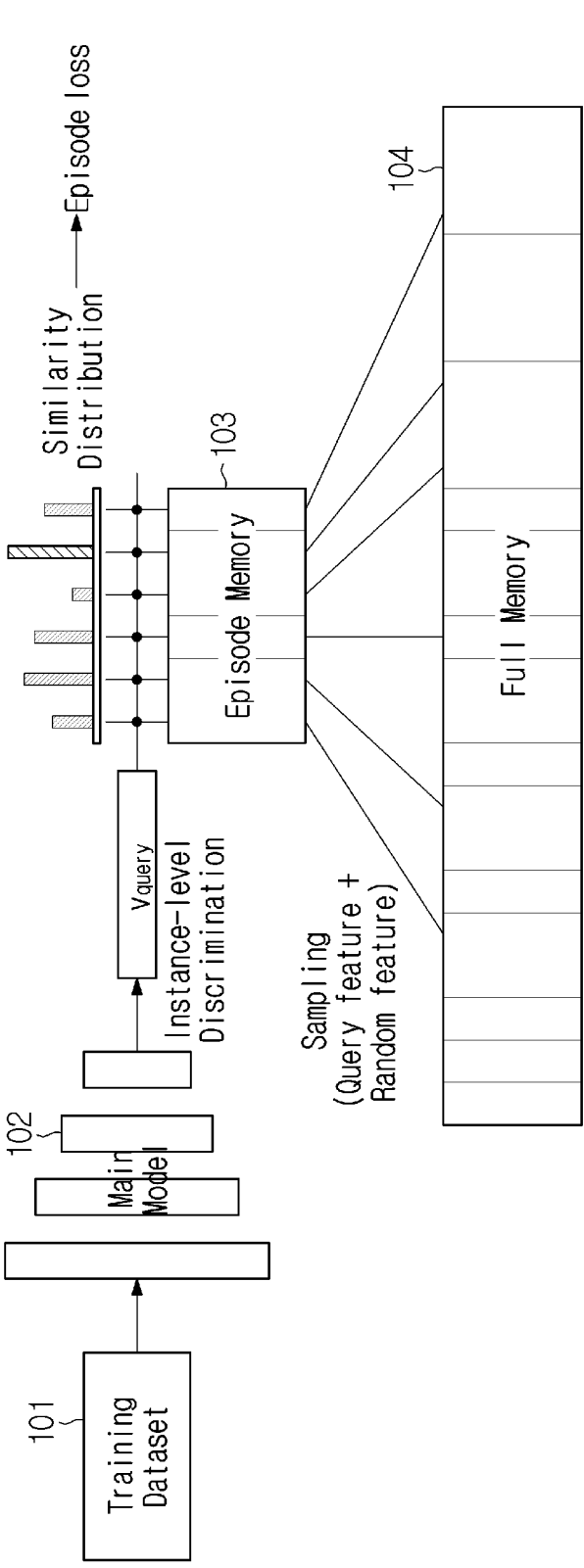
FIG. 1 is a view showing a structural diagram of a method for training an artificial intelligence model according to an embodiment of the present disclosure.

Hereinafter, embodiments of the present disclosure will be described in detail with reference to the accompanying drawings, which will be easily implemented by those skilled in the art. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. In addition, parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, embodiments that include other components in addition to the components described in the various embodiments are also included in the scope of the present disclosure.

Before describing the embodiments of the present disclosure in detail with reference to drawings, an artificial intelligence training technique applicable to the present disclosure will be described.

In order to overcome the problem of the related art described above, a few-shot learning technique is proposed which uses only a small number of examples for learning.

Few-shot learning is a technique of training an artificial neural network (ANN) to perform a task for a new class, for which artificial intelligence has not been trained, only with a very small amount of data. As one of the representative few-shot learning methods, episodic learning is a technique of training an ANN in episodic units in a learning situation by assuming that a scenario of performing a task for query data, which are input with a small number of examples given to each class, is a single episode. In the case of an image classification task, for example, when there are N instance classes and k image examples are given to each class, a task of determining which of the N classes query image as input belong to may be constructed as a single episode. Accordingly, an ANN may be trained to construct an episode randomly by means of training data with class labels and to improve the performance of an image classification task.

However, few-shot learning techniques including episodic learning also have a problem that learning is possible only with data having class labels. Especially, as a task for a class more specific than an existing class is considered, it becomes more difficult to obtain data with a class label, which may result in a difficult of implementation.

Meanwhile, studies on unsupervised learning methods for ANNs using data without class labels are actively underway, and one of those methods proposes an instance-level discrimination technique. Instance-level discrimination is a self-supervised learning technique of training an ANN to generate feature vectors so that instances of training data become distinct from each other. If an ANN makes feature vectors capable of discriminating instances, actually similar instances also have a high similarity of feature vectors. However, training an ANN by the instance-level learning method may cause great computational overhead.

The present disclosure proposes a new technique that combines only advantages of the few-shot learning and the instance-level discrimination. According to the present disclosure, an artificial intelligence model may be trained using only a small number of training datasets, even when there is no label, and in a stage of task performance, a given task for a new class may be smoothly performed using only a small number of datasets and with no further learning process.

Meanwhile, in the description of the present disclosure, an apparatus for training artificial intelligence may be an artificial intelligence apparatus.

Hereinafter, the embodiments of the present disclosure will be described in further detail with reference to accompanying drawings.

FIG. 1 is a view showing a structural diagram of a method for training an artificial intelligence model according to an embodiment of the present disclosure. Specifically, it is a structural diagram of a few-shot self-supervised learning method for training an artificial intelligence model performing a given task.

In an embodiment, an artificial intelligence system including an artificial intelligence model for few-shot self-supervised learning may include an artificial intelligence model (main model) 102 capable of receiving a training dataset 101 as input data, and the artificial intelligence model 102 may generate output data ($V_{query}$) according to the input data. Also, the artificial intelligence system may include an episodic memory 103 and a full memory 104.

The training dataset 101, which is data for training an artificial intelligence model, may be image data, text data or voice data, but is not limited thereto. That is, there is no limitation in the type of data, and there may be a plurality of datasets.

Herein, it is assumed that an artificial intelligence model is suitable for perform any given task. For example, the artificial intelligence model 102 may include an ANN based on a CNN and an autoencoder. As another example, the artificial intelligence model 102 may be a statistical model like a probabilistic graphical model. Hereinafter, in describing an embodiment of the present disclosure, it is assumed, for convenience of explanation, that an artificial intelligence model includes an ANN, but the present disclosure is not limited thereto.

In an embodiment, it is assumed that a training dataset 101 comprising n data are given to train the artificial intelligence model 102. First, there may be a separate artificial intelligence model for training the artificial intelligence model 102. The separate artificial intelligence model may generate an initial feature vector from each training dataset. Output data, which are obtained by inputting a training dataset into a separate artificial intelligence model different from the artificial intelligence model (main model) 102 to be trained, may be generated as an initial feature vector and be used to initialize a full memory. Meanwhile, as an example, the separate different artificial intelligence model may be pretrained to perform a more general task. That is, each training dataset may be input into a separate artificial intelligence model, and the separate artificial intelligence model may output a feature vector as output data ($V_{query}$).

As another example, an initial feature vector may be obtained by inputting each training dataset into a pretrained deep ANN included in an artificial intelligence model, and the initial feature vector may be output data ($v_{query}$). Herein, the artificial intelligence model may not be a separate artificial intelligence model as in the above example but be an artificial intelligence model (main model) to be trained. Herein, the artificial intelligence model may be an untrained model.

As another example, it is also possible to generate and use n initial feature vectors at random, but the present disclosure is not limited thereto.

Meanwhile, N feature vectors obtained from training datasets may be stored sequentially in the full memory 104. Here, if i denotes any index of the full memory, $i \in \{1, \ldots, N\}$ and a feature vector of i-th training dataset may correspond to i-th slot of the full memory.

Meanwhile, during a learning process of an artificial intelligence model, a feature vector of the full memory 104 may also be updated. For example, during a learning process of an artificial intelligence model, when a training dataset comprising n data may be input into the artificial intelligence model at a predetermined interval and corresponding output data may be obtained, a feature vector may be obtained from the output data and be stored in a full memory, thereby updating the full memory.

In an embodiment, a learning process of an artificial intelligence model may be implemented as follows. First, query data and a plurality of random datasets may be selected from the training dataset 101. Herein, the query data may be one dataset or a plurality of datasets. When a plurality of query datasets is selected, the query datasets may be bound to construct a mini batch. When describing an embodiment below, it is assumed, for convenience of explanation, that B query datasets constitute a single mini batch.

As an example, one episodic memory 103 may be constructed by finding an index and a feature vector, which correspond to query data, and an index and a feature vector of random data from the full memory 104. Specifically, the episodic memory 103 may be constructed by selecting K ($\leq N$) from N feature vectors in a full memory, and B ($\leq K$) feature vectors may correspond to feature vectors of query data. Herein, for convenience of explanation, it is assumed that first B slots of an episodic memory correspond to feature vectors of query data. An episodic memory may include a function m and a matrix M. For index $k \in \{1, \ldots, K\}$ indicating an order of slots, m (k) may indicate to which slot in a full memory the k-th feature vector in the episodic memory corresponds, and M [k] may refer to the k-th feature vector itself in the episodic memory.

Meanwhile, it is assumed that, when query data are input into an artificial intelligence model, output data ($V_{query}$) are derived. A similarity may be calculated between the output data ($V_{query}$) and feature vectors in an episodic memory. When an artificial intelligence system is in an ideal situation, the similarity may be highest between the output data ($v_{query}$) and a feature vector corresponding to query data in an episodic memory. Based on a calculation result of similarity, an episode loss function may be calculated, and this loss function may be used to train the artificial intelligence model 102. The artificial intelligence model 102 may be optimized by repeating the process.

In an embodiment, an episode loss function may be calculated as follows. When an artificial intelligence model includes a deep ANN, this deep ANN is denoted by $f_\theta$, i-th training dataset is $x_i$, i-th feature vector (or the feature vector of i-th slot of a full memory) is $v_i$, and a user-defined temperature parameter is $\tau$, an episode loss function EpiLoss may be calculated based on a method of calculating an instance-level discrimination loss function, as follows.

$$EpiLoss = -\frac{1}{B}\sum_{j=1}^{B}\log P(j \mid f_\theta(x_{m(j)})) \qquad \text{Equation 1}$$

$$P(j \mid v) = \frac{\exp\left(M[j]^T v/\tau\right)}{\sum_{k=1}^{K}\exp\left(M[k]^T v/\tau\right)}$$

As an example, the loss function of Equation 1 above is calculated based on a probability (P) that, when query data correspond to j-th slot in an episodic memory, the j-th slot in the episodic memory corresponds to the query data by using output data $v_{query}=f_\theta(x_{m(j)})$ that are obtained from an artificial intelligence model. Herein, the loss function may be referred to as a hard-attention loss function.

As another example, for vector v and function softmax, when a function of normalizing a sum of elements of v into 1 is denoted by softmax (v), an episode loss function EpiLoss may be calculated as follows.

$$EpiLoss = \frac{1}{B}\sum_{j=1}^{B}\left|f_\theta(x_{m(j)}) - Mp_j\right| \qquad \text{Equation 2}$$

$$p_j = softmax\left(Mf_\theta(x_{m(j)})/\tau\right)$$

The above loss function calculates how much difference is generated by reconstructing output data $v_{query}=f_\theta(x_{m(j)})$ that is obtained from a main model by using a probability vector $p_j$ having, as each element, a probability that k-th slot in an episodic memory corresponds to query data when the query data correspond to j-th slot in the episodic memory. Herein, the loss function may be referred to as a soft-attention loss function.

Meanwhile, as another example, the following episode loss function EpiLoss may be calculated by combining the hard-attention loss function and the soft-attention loss function.

$$EpiLoss = \beta \cdot \frac{1}{B}\sum_{j=1}^{B}\left|f_\theta(x_{m(j)}) - Mp_j\right| + \qquad \text{Equation 3}$$

$$(1-\beta)\cdot\left[-\frac{1}{B}\sum_{j=1}^{B}\log P(m(j) \mid f_\theta(x_{m(j)}))\right]$$

However, the above-described process of deriving a loss function is merely one embodiment, and the loss function calculation of the present disclosure is not limited thereto.

Hereinafter, for clarify of description, it is assumed that an artificial intelligence model including a main model may be trained in this way, but the present disclosure is not limited thereto.

Meanwhile, as an embodiment, the method for training an artificial intelligence model of FIG. 1 may further include, before constructing an episodic memory, initializing an artificial intelligence model (main model) and a full memory or, after deriving an episode loss function, updating an artificial intelligence model. This will be described in further detail with reference to FIG. 4.

Figure 2:
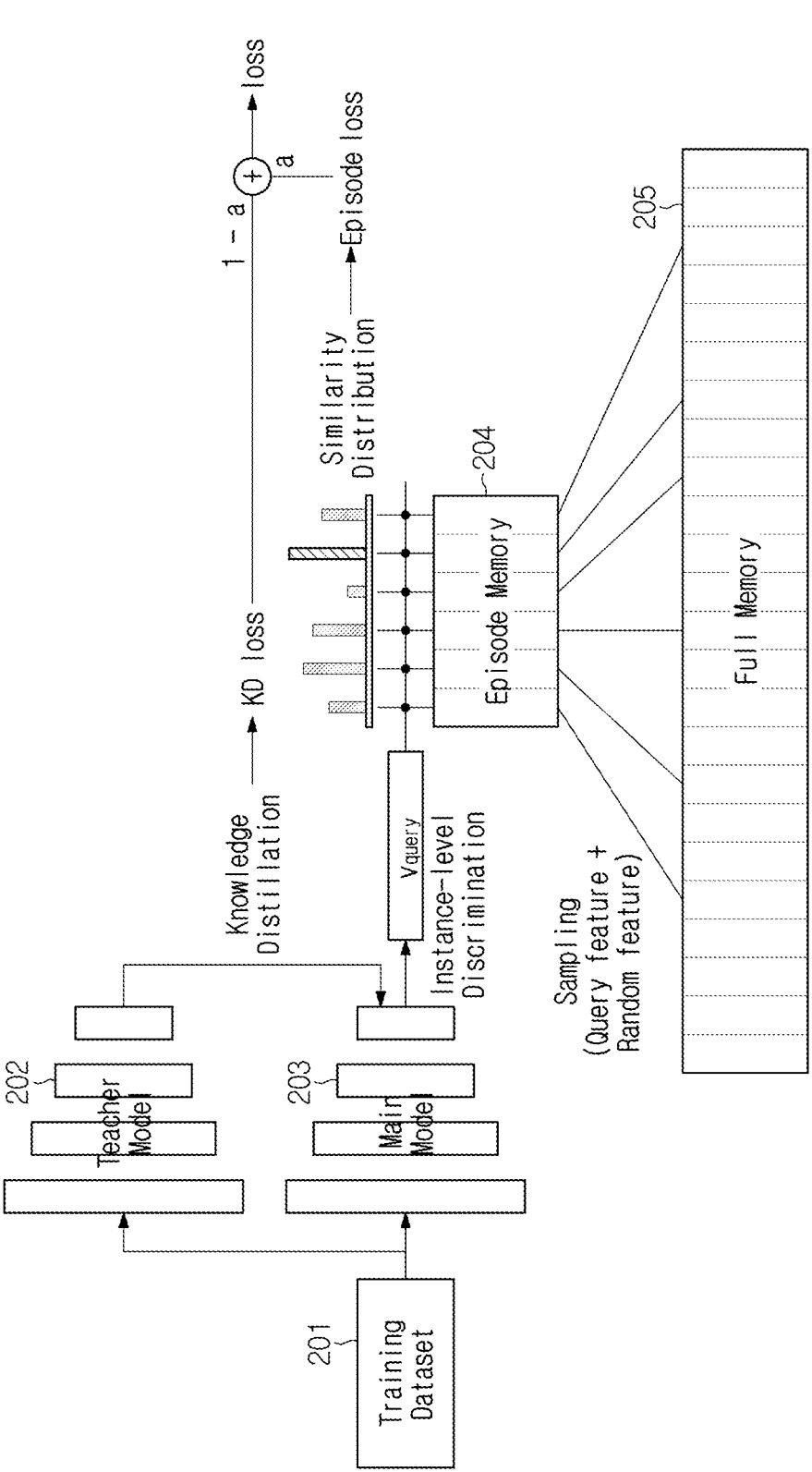
FIG. 2 is a view showing a structural diagram of a method for training an artificial intelligence model based on a knowledge distillation technique according to another embodiment of the present disclosure.

FIG. 2 is a view showing a structural diagram of a method for training an artificial intelligence model based on a knowledge distillation technique according to another embodiment of the present disclosure. Specifically, FIG. 2 is a structural diagram of a few-shot self-supervised learning method applying a knowledge distillation technique as an example technique of extending a few-shot self-supervised learning technique for training an artificial intelligence (e.g., main model) that performs a given task.

In an embodiment, an artificial intelligence system including an artificial intelligence model for few-shot self-supervised learning may include a main model 203 and a teacher model 202, which are artificial intelligence models capable of receiving a training dataset 201 as input data, and the main model 203, which is an artificial intelligence model, may generate output data ($v_{query}$) according to the input data. Also, the artificial intelligence system may include an episodic memory 204 and a full memory 205.

In an embodiment, the training dataset 201, the main model 203, the episodic memory 204 and the full memory 205 may be the same as what was described by other drawing numbers (e.g., 101, 102, 103 and 104) in FIG. 1.

In an embodiment, unlike FIG. 1, the method of FIG. 2 is further based on a teacher model as a separate artificial intelligence model apart from a main model that is an artificial intelligence model. As an example, there may be a pretrained teacher model as a separate artificial intelligence model, and intrinsic knowledge of the teacher model may be forwarded to a main model by a knowledge distillation method when the main model is trained. According to the embodiment of FIG. 1, a main model may be trained by reflecting only an individual feature of a training dataset but not considering a class of the training dataset. According to this embodiment, a main model may learn meaningful knowledge that may be more useful to perform a task indirectly through a pretrained teacher model.

In an embodiment, the teacher model 202 may perform knowledge distillation on a main model as follows. It is assumed that a deep ANN is included in the main model and the number of neurons on a last layer of the deep ANN is $n_s$. In this case, output data $f_\theta(x)$ obtained through the main model may be expressed by a $n_s$—dimensional vector. Meanwhile, when it is assumed that output data $f_\varphi(x)$ obtained through the teacher model is expressed by a $n_t$—dimensional vector, the number of neurons on the last layer of the main model may be increased to $n_s+n_t$, and the former $n_s$ neurons may be used to generate output data $$f_\theta^s(x)$$

and the latter $n_t$ neurons may be used to generate output data $$f_\theta^t(x).$$

In case the last layer of the main model is a fully connected layer, the above process may be implemented simply by increasing the number of neurons. Herein, as described in FIG. 1, the output data $$f_\theta^s(x)$$

may be used to calculate an episode loss function and may also be used as a feature vector. Meanwhile, the output data $$f_\theta^t(x)$$

may be used to calculate a loss function related to knowledge distillation.

In an embodiment, calculation of a loss function may be performed as follows. First, an episode loss function, which may be obtained using the memory 204, may use the same method as described above with reference to FIG. 1. Besides, when a knowledge-distillation loss function, which may be obtained using knowledge distillation, assumes that a teacher model includes an ANN and the ANN is denoted by $f_\varphi$, the function may be calculated as follows.

$$KDLoss = -\frac{1}{B}\sum_{j=1}^{B}KL\big(softmax\big(f_\varphi(x_{m(j)})/\tau\big)\big\|softmax\big(f_\theta^t(x_{m(j)})/\tau\big)\big) \qquad \text{Equation 4}$$

Accordingly, when combining the episode loss function and the knowledge-distillation loss function, the following one loss function may be calculated.

$$Loss=\alpha\cdot EpliLoss+(1-\alpha)\cdot KDLoss \qquad \text{Equation 5}$$

According to Equation 5, a single loss function may be generated by applying weights to an episode loss (EpiLoss) function and a knowledge-distillation loss (KDLoss) function respectively. In this case, the sum of weights may be 1.

However, the above-described process of deriving a loss function is merely one embodiment, and the loss function calculation of the present disclosure is not limited thereto.

Meanwhile, as an embodiment, the method for training an artificial intelligence model of FIG. 2 may further include, before constructing an episodic memory, initializing an artificial intelligence model (main model) and a full memory or, after deriving an episode loss function, updating an artificial intelligence model. This will be described in further detail with reference to FIG. 4.

Figure 3A:
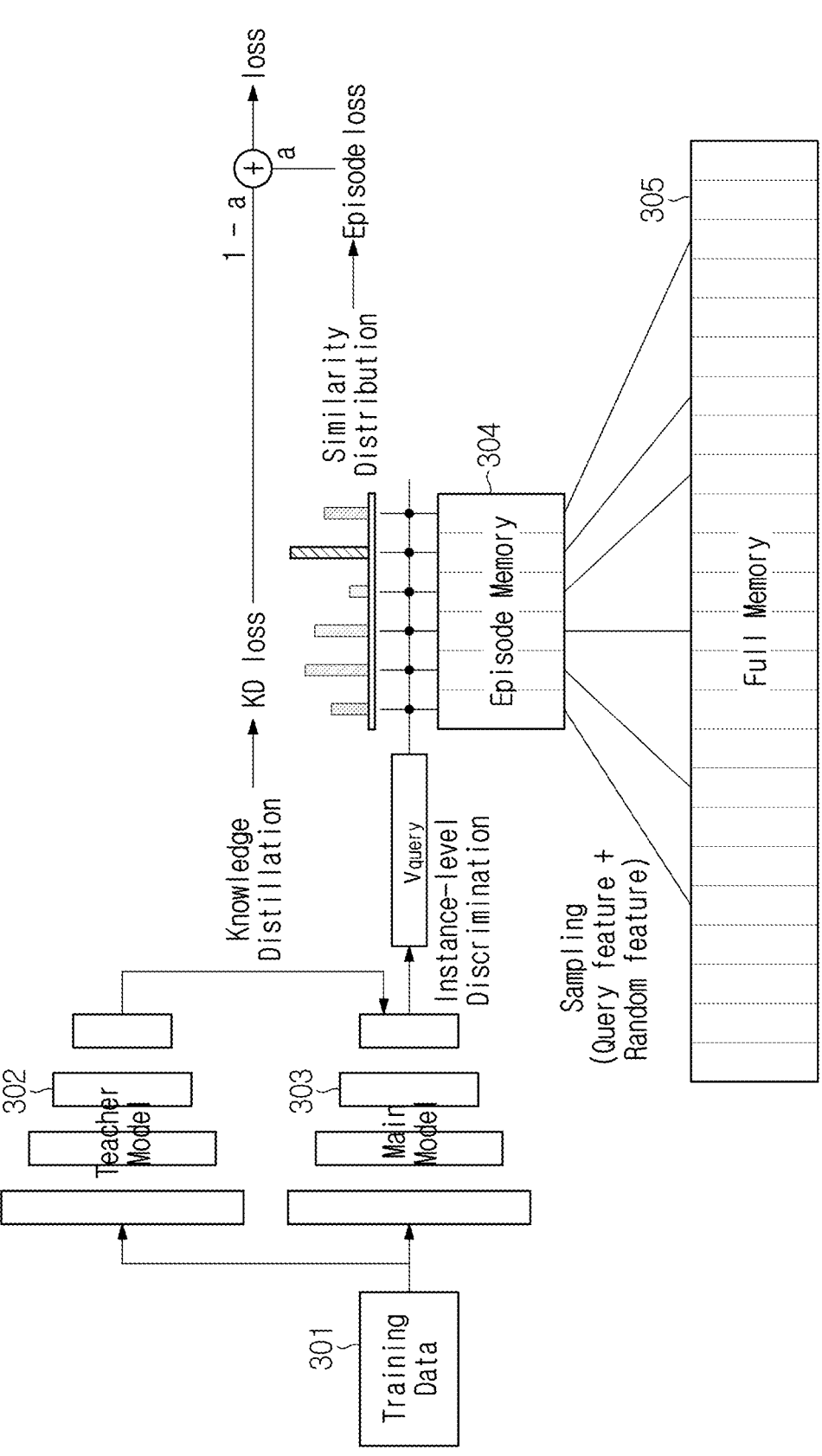
FIG. 3A is a view showing a structural diagram of a method for training an artificial intelligence model for a task capable of vertical expansion according to another embodiment of the present disclosure.

FIG. 3A is a view showing a structural diagram of a method for training an artificial intelligence model for a task capable of vertical expansion according to another embodiment of the present disclosure. Specifically, as an embodiment, FIG. 3A is a view for explaining a training and testing method for performing an image classification task capable of vertical expansion, that is, a classification task in subdivided units of instance class in an image.

In an embodiment, as illustrated in FIG. 3A, an artificial intelligence system including an artificial intelligence model may include a main model 303 and a teacher model 302, which are artificial intelligence models capable of receiving a training dataset 301 as input data, and the main model 303, which is an artificial intelligence model, may generate output data ($V_{query}$) according to the input data. Also, the artificial intelligence system may include an episodic memory 304 and a full memory 305.

In an embodiment, the training dataset 301, the teacher model 302, the main model 303, the episodic memory 304 and the full memory 305 may be the same as what was described by other drawing numbers (e.g., 101, 102, 103 and 104) in FIG. 1 and/or what was described by other drawing numbers (e.g., 201, 202, 203 and 204) in FIG. 2.

In an embodiment, in order to smoothly perform a task capable of vertical expansion (e.g., an image partitioning task), it may be necessary to train a model so as to discriminate a feature vector of each subdivided class from feature vectors of other subdivided classes. Furthermore, as the number of training datasets of subdivided classes may be significantly smaller than the number of training datasets of upper classes, the model needs to be well trained even when using a rather smaller number of datasets. Hereinafter, embodiments of the present disclosure will be described by assuming an image classification task that satisfies the above conditions and is also capable of efficient and reliable vertical expansion. However, the present disclosure is not limited thereto.

As an embodiment, according to the embodiment of FIG. 3A, a main model may be trained to perform a task capable of vertical expansion (e.g., an image classification task). First, an example dataset of a subdivided class to be classified may be prepared. Such an example dataset may be expressed by the training dataset 301. For example, when classifying a bird class into subdivided units, images corresponding to subdivided species of birds (e.g., pigeon, owl, sparrow, cuckoo, etc) may be collected and be used as an example dataset.

Herein, a subdivided class of the training dataset and a subdivided class to be classified do not need to be identical. In addition, a class label as to which subdivided class each image of training sets belongs is not necessarily required.

Meanwhile, the main model 303, which is an artificial intelligence model and may be selected as an ANN suitable especially for an image classification task. For example, a deep ANN like a convolutional neural network, which is well applied to an image classification task, may be used as a main model. However, the present disclosure is not limited thereto.

The teacher model 302, which is an artificial intelligence model, may also include an ANN and may be selected as a pretrained ANN capable of performing an image classification task. Herein, the teacher model does not need to be an ANN that performs a same image classification task as the main model. For example, a trained model capable of performing a general image classification task like an ImageNet classification task may be selected as the teacher model. In an embodiment, when a training dataset, a main model and a teacher model are thus prepared, the main model may be trained as described in FIG. 1 and FIG. 2.

Meanwhile, in describing an embodiment of the present disclosure with reference to FIG. 3A, an image classification task was used as a task capable of vertical expansion. However, this was intended merely for clarity of description, and the present disclosure is not limited thereto.

Figure 3B:
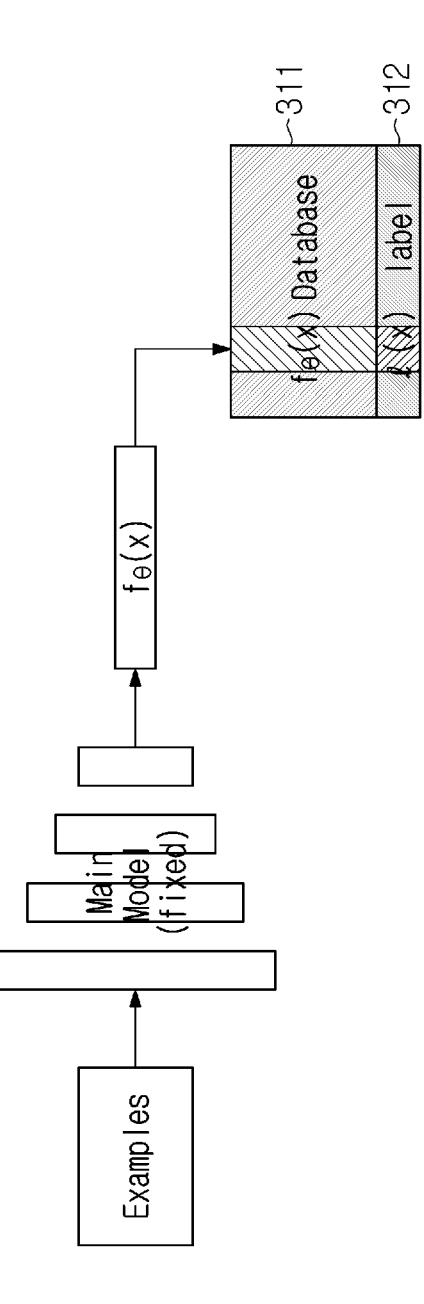
FIG. 3B is a view showing a procedure of registering a feature vector of each subdivided class according to an embodiment of the present disclosure.

FIG. 3B is a view showing a procedure of registering a feature vector of each subdivided class according to an embodiment of the present disclosure.

In an embodiment, for clarity of description, the embodiment of FIG. 3B is described based on the structural diagram of FIG. 3A, but the present disclosure is not limited thereto. An artificial intelligence system, on which the feature vector registration process of each class in FIG. 3B is based, may or may not include a teacher model.

In an embodiment, FIG. 3B may show a step of feature vector registration of each class for performing a task capable of vertical expansion (e.g., an image classification task) by using a trained main model. Output data, which are obtained by inputting examples of a subdivided class to be classified into a trained main model, are considered as a feature vector, and the pair of the feature vector and a class label 312 may be stored in a database 311. Herein, the database may be a separate database or a full memory. For example, in order to classify a bird class into subdivided classes (e.g., ivory gull, mallard duck, raven, etc), one or more example image datasets may be prepared in each subdivided class, each image may be used as an input image of a main model, and a feature vector corresponding to each input dataset may be stored in a database along with a subdivided class label. Herein, subdivided classes do not need to be classes used for training, and the main model may be fixed and not perform any further learning.

Figure 3C:
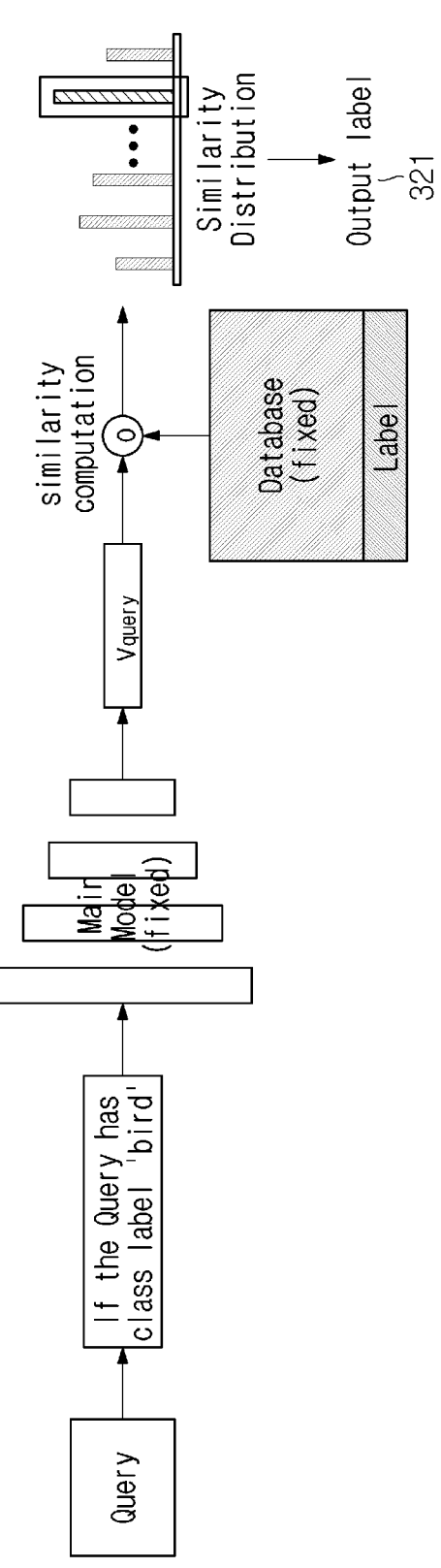
FIG. 3C is a view showing a structural diagram for classifying image data into subdivided classes according to an embodiment of the present disclosure.

FIG. 3C is a view showing a structural diagram for classifying input image data into subdivided classes according to an embodiment of the present disclosure.

In an embodiment, for clarity of description, the embodiment of FIG. 3C is described based on the structural diagrams of FIG. 3A and FIG. 3B, but the present disclosure is not limited thereto. An artificial intelligence system, on which the classification into subdivided classes in FIG. 3C is based, may or may not include a teacher model.

In an embodiment, FIG. 3C may show a step of subdivided image classification for performing a task capable of vertical expansion (e.g., an image classification task) by using a trained main model. In this step, when a query image (query data) for performing subdivided class classification is input data, it may be determined first whether or not query image data correspond to a designated upper class (e.g., new class), and when the query image data correspond to the upper class, a feature vector $v_{query}$ may be obtained as output data by inputting the query image data as an input data of a trained main model. For example, in order to classify subdivided classes of a new class, query image data may be classified at an upper class level to see whether or not the query image data correspond to the new class. Classification at the upper class level may be implemented through a well-known artificial intelligence technique. For example, when it is determined that query image data correspond to a new class, a feature vector $v_{query}$ may be obtained as output data of the query image data by inputting the query image data as an input data of a trained main model. Then, a similarity may be calculated between this feature vector $v_{query}$ and feature vectors that are stored in a database in the step of feature vector registration of each class in FIG. 3B. The class label of a feature vector having a highest similarity may be allocated as a class label of a query image so that an output label 321 may be obtained, and thus subdivided image classification may be performed.

Hereinafter, embodiments of a method and apparatus for training an artificial intelligence model based on an episodic memory according to the present disclosure will be described with reference to drawings. Meanwhile, the above description referring to another drawing may be applied to the method and apparatus for training an artificial intelligence model based on an episodic memory, which may be based on the technique, artificial intelligence system and the like shown in the description. However, the present disclosure is not limited thereto.

Figure 4:
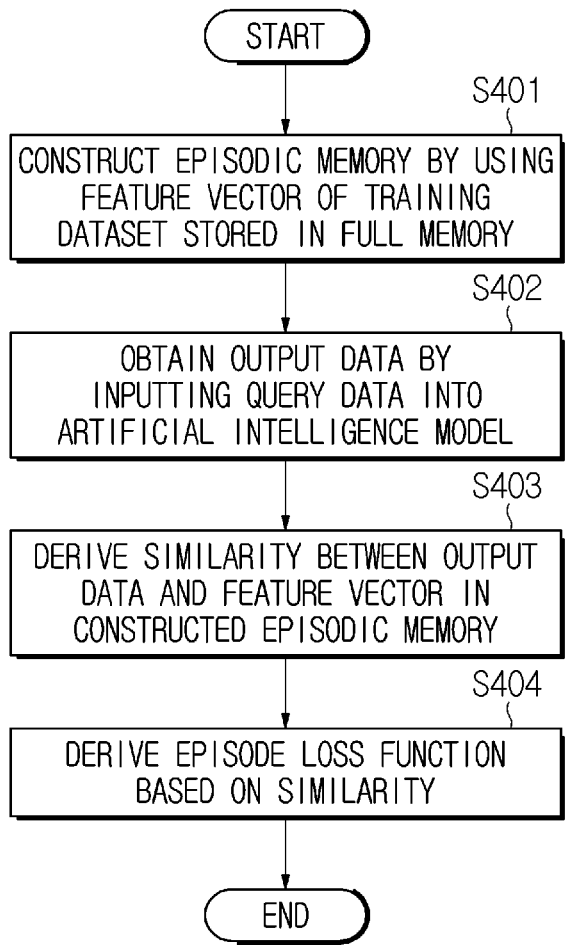
FIG. 4 is a view showing a method for training an artificial intelligence model based on an episodic memory according to an embodiment of the present disclosure.

FIG. 4 is a view showing a method for training an artificial intelligence model based on an episodic memory according to an embodiment of the present disclosure.

Figure 5:
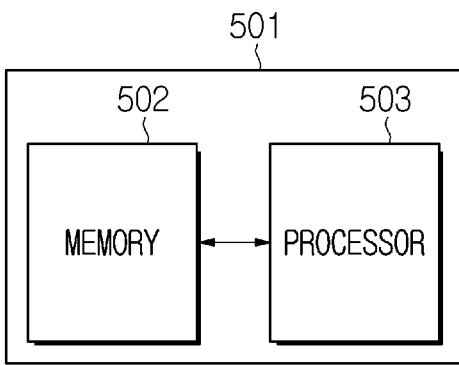
FIG. 5 is a view showing an apparatus for training an artificial intelligence model based on an episodic memory according to an embodiment of the present disclosure.

In an embodiment, the method for training an artificial intelligence model based on an episodic memory in FIG. 4 may be implemented by an apparatus for training an artificial intelligence model, which includes the apparatus for training an artificial intelligence model based on an episodic memory of FIG. 5, an artificial intelligence system and/or an artificial intelligence apparatus.

Meanwhile, although not shown in FIG. 4, before constructing an episodic memory (S401), a process of initializing an artificial intelligence model (main model) and a full memory may be performed. In an embodiment, the process of initializing the artificial intelligence model may be performed by designating a random value for a parameter of the artificial intelligence model or bring a parameter of a pretrained model. In addition, as described with reference to FIG. 1 above, a process of initializing a full memory may include a process of designating output data, which are obtained through an initialized artificial intelligence model, or output data obtained from another artificial intelligence model. After this initializing process, an episodic memory may be constructed (S401). However, the present disclosure is not limited thereto.

As an example, the episodic memory may be constructed (S401) by using a feature vector of a training dataset stored in a full memory. Herein, as mentioned above, the training dataset may be an image dataset, a text dataset and/or a voice dataset, and there may a plurality of training datasets. Also, the training dataset may include query data and random data. The episodic memory may include an index in a full memory for a feature vector included in the episodic memory and a matrix representation of the feature vector. In addition, the full memory may store a class label corresponding to the feature vector. Meanwhile, a feature vector of the training dataset may be stored in the full memory and be updated at a predetermined interval. As an example, the full memory may further include a database.

When the episodic memory is constructed, output data may be obtained by inputting query data into an artificial intelligence model (S402). As an example, a plurality of the query data may form mini batch. Herein, the output data may be a feature vector, as mentioned above, and the artificial intelligence model may include an ANN and be based on a CNN or an autoencoder. In addition, the artificial intelligence model may include a first artificial intelligence model and a second artificial intelligence model, the second artificial intelligence model may be a teacher model that forwards intrinsic knowledge to the first artificial intelligence model through knowledge distillation, and the first artificial intelligence model may be a main model. Also, the second artificial intelligence model may include a pretrained ANN for performing a task including an image classification task. Herein, the second artificial intelligence model may include a pretrained ANN that performs a same type of task (e.g., image classification task) as the first artificial intelligence model. In addition, the pretrained ANN may include a CNN-based ANN.

Next, a similarity may be derived between the output data and a feature vector in the constructed episodic memory (S403). As an example, when a class label corresponding to a feature vector is stored in the full memory, a class label of a feature vector with highest similarity may be allocated as a class label of the query data.

In addition, an episode loss function may be derived based on a similarity (S404). As an example, the episode loss function may be derived based on at least one of a hard-attention loss function and a soft-attention loss function. As another example, the episode loss function may be derived based on both a hard-attention loss function and a soft-attention loss function. Meanwhile, as mentioned above, the hard-attention loss function may be derived based on a probability that an arbitrary slot in the episodic memory corresponds to the query data, and when the arbitrary slot in the episodic memory corresponds to the query data, the soft-attention loss function may be derived based on a difference between the output data that are obtained through the artificial intelligence model by using a probability that another arbitrary slot in the episodic memory corresponds to the query data.

Meanwhile, although not shown in FIG. 4, after deriving the episode loss function (S404), a process of updating the artificial intelligence model may be implemented. When the artificial intelligence model is assumed to be an ANN, back propagation may be performed by calculating a differential value of the episode loss function and updating a parameter of the artificial intelligence model based on the value. In an embodiment, various algorithms may be applied to back propagation, but the parameter updating process of the model may be implemented by using an optimization algorithm like stochastic gradient descent (SGD).

Meanwhile, a knowledge distillation loss function may be derived using the second artificial intelligence model, and this may be expressed by a separate step (for example, after deriving the episode loss function based on a similarity (S404)). In addition, a final loss function may be derived by applying weights to the episode loss function and the derived knowledge distillation loss function, and this may also be expressed as a separate step (for example, after deriving the episode loss function based on a similarity (S404)). The sum of the weights may be 1.

As the order of the steps in the method for training an artificial intelligence method based on an episodic memory in FIG. 4 is merely an embodiment, the order may be modified, another step may be added or some of the steps may be removed.

In addition, since FIG. 4 is an embodiment of the present disclosure, except the initializing process mentioned above, the steps S401 to S404 and the above-mentioned model updating process may be implemented once, but those processes may be repeated to derive an optimal artificial intelligence model. That is, the steps S401 to S404 and the model updating process may be repeated predetermined times. That is, the episodic memory may be reconstructed after the episode loss function is derived. In addition, the steps and the model updating process may be repeated until a given condition is satisfied. Herein, the condition may be preset or be flexible.

FIG. 5 is a view showing an apparatus for training an artificial intelligence model based on an episodic memory according to an embodiment of the present disclosure.

In an embodiment, the apparatus 501 for training an artificial intelligence model based on an episodic memory in FIG. 5 may include a memory 502 and a processor 503 and may implement methods for training an artificial intelligence model, including the methods for training an artificial intelligence model in FIG. 1 and FIG. 3A, FIG. 3B and FIG. 3C and the method for training an artificial intelligence model based on an episodic memory in FIG. 4. That is, the descriptions referring to FIGS. 1 to 4 may be applied to FIG. 5.

As an example, the memory 502 may store a feature vector of a training dataset and may include a full memory and an episodic memory. In addition, as mentioned above, the memory 502 may include a database.

In addition, the processor 503 may control the memory 502, construct an episodic memory by using a feature vector of a training dataset stored in the full memory, and obtain output data by inputting query data into an artificial intelligence model. In addition, the processor 503 may derive a similarity between the output data and a feature vector in the constructed episodic memory and derive an episode loss function based on the similarity. This is the same as mentioned above.

Meanwhile, although not explicitly shown in FIG. 5, the apparatus 501 of FIG. 5 may further include a transceiver capable of communicating with an external artificial intelligence apparatus, and an external apparatus or system including an artificial intelligence training apparatus and system.

According to the present disclosure, a technique is proposed which trains an artificial intelligence model by constructing an episodic memory in a training process of the artificial intelligence model, even when there is no class label, and by using a relatively small number of training datasets and performs a given task using only a small number of datasets for a new class. Especially, when using the training technique according to the present disclosure, a given task for a new class may be smoothly performed by using a pretrained artificial intelligence model without a further training process for the artificial intelligence model. In addition, the training technique according to the present disclosure may obtain a better task performance result by being smoothly combined with a separate technique of enabling information on a given task to be better reflected.

The various embodiments of the disclosure are not intended to be all-inclusive and are intended to illustrate representative aspects of the disclosure, and the features described in the various embodiments may be applied independently or in a combination of two or more.

When describing various embodiments of the present disclosure, components and/or steps, which are described using a same term, may indicate a same thing. In addition, descriptions of embodiments referring to respective drawings may be applied in a mutually complementary way, unless there is a clearly inconsistent description.

Also, the various embodiments of the present invention may be implemented by hardware, firmware, software, or a combination thereof. In addition, the embodiments may be implemented not by only one software program but by a combination of two or more software programs, and one subject may not execute a whole process.

In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation. For example, various types of implementations including the general processor may be possible. It is also evident that one hardware unit or a combination of two or more hardware units may be applied to the present disclosure.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer.

In an embodiment, a computer program stored in a non-transitory computer-readable medium according to the present disclosure may perform: constructing an episodic memory by using a feature vector of training data stored in a full memory; obtaining output data by inputting query data into an artificial intelligence model; deriving a similarity between the output data and a feature vector in the constructed episodic memory; and deriving an episode loss function based on the similarity.

It will be apparent to those skilled in the art that various substitutions, modifications and changes are possible are possible without departing from the technical features of the present disclosure. It is therefore to be understood that the scope of the present disclosure is not limited to the above-described embodiments and the accompanying drawings.

What is claimed is:

1. A computer-implemented method for training artificial intelligence based on an episodic memory, the method comprising:

constructing an episodic memory to include a representation of a feature vector stored in a full memory, the feature vector being associated with a training dataset;

obtaining output data by inputting query data into an artificial intelligence model;

deriving a similarity between the output data and the representation in the episodic memory; and deriving an episode loss function based on the similarity, wherein the feature vector is generated by inputting the training dataset into a pretrained deep neural network and includes a plurality of numerical elements, wherein constructing the episodic memory, obtaining the output data, deriving the similarity, and deriving the episode loss function are repeated a plurality of times during training to iteratively update one or more parameters of the artificial intelligence model using backpropagation based on the episode loss function and an optimization algorithm, and wherein, after each iteration of the training, the full memory is configured to update the feature vector stored in the full memory by:

inputting at least a portion of the training dataset into the artificial intelligence model after the one or more parameters are updated to generate updated output data;

generating an updated feature vector based on the updated output data; and storing the updated feature vector in the full memory in association with the training dataset prior to constructing the episodic memory for a next iteration of the training.

2. The computer-implemented method of claim 1, wherein the episodic memory comprises an index in the full memory for the-a feature vector comprised and the representation is a matrix representation of the feature vector.

3. The computer-implemented method of claim 1, wherein the episode loss function is derived based on at least one of a hard-attention loss function and a soft-attention loss function.

4. The computer-implemented method of claim 3, wherein the hard-attention loss function is derived based on a probability that an arbitrary slot in the episodic memory corresponds to the query data.

5. The computer-implemented method of claim 4, wherein, in response to the arbitrary slot in the episodic memory corresponding to the query data, the soft-attention loss function is derived based on a difference between the output data that are obtained through the artificial intelligence model by using a probability that another arbitrary slot in the episodic memory corresponds to the query data.

6. The computer-implemented method of claim 1, wherein the artificial intelligence model comprises a first artificial intelligence model and a second artificial intelligence model, wherein the second artificial intelligence model comprises a pretrained artificial neural network that performs a same type of task as the first artificial intelligence model.

7. The computer-implemented method of claim 6, further comprising deriving a knowledge distillation loss function by using the second artificial intelligence model.

8. The computer-implemented method of claim 7, further comprising deriving a final loss function by applying a weight to the episode loss function and the knowledge distillation loss function.

9. The computer-implemented method of claim 1, wherein the artificial intelligence model is based on a convolutional neural network (CNN) or an autoencoder.

10. The computer-implemented method of claim 1, wherein the full memory stores a class label corresponding to the feature vector.

11. The computer-implemented method of claim 10, wherein a class label of a feature vector with a highest similarity is allocated as a class label of the query data.

12. The computer-implemented method of claim 1, wherein the training dataset comprises the query data and random data.

13. The computer-implemented method of claim 1, wherein a plurality of the query data forms mini batch.

14. The computer-implemented method of claim 1, further comprising initializing the artificial intelligence model and the full memory before the episodic memory is constructed.

15. The computer-implemented method of claim 1, wherein the episodic memory is constructed only once per training iteration.

16. An apparatus for training artificial intelligence based on an episodic memory, the apparatus comprising:

a full memory comprising a feature vector associated with a training dataset; and a processor configured to control the full memory, wherein the processor is further configured to:

construct an episodic memory to include a representation of the feature vector;

obtain output data by inputting query data into an artificial intelligence model;

derive a similarity between the output data and the representation in the episodic memory; and derive an episode loss function based on the similarity, wherein the feature vector is generated by inputting the training dataset into a pretrained deep neural network and includes a plurality of numerical elements, wherein the processor is configured to repeatedly construct the episodic memory, obtain the output data, derive the similarity, and derive the episode loss function a plurality of times during training to iteratively update one or more parameters of the artificial intelligence model using backpropagation based on the episode loss function and an optimization algorithm, and wherein, after each iteration of the training, the processor is configured to update the feature vector stored in the full memory by:

inputting at least a portion of the training dataset into the artificial intelligence model after the one or more parameters are updated to generate updated output data;

generating an updated feature vector based on the updated output data; and storing the updated feature vector in the full memory in association with the training dataset prior to constructing the episodic memory for a next iteration of the training.

17. A non-transitory computer-readable medium storing a computer program, the computer program implementing:

constructing an episodic memory to include a representation of a feature vector stored in a full memory, the feature vector being associated with a training dataset;

obtaining output data by inputting query data into an artificial intelligence model;

deriving a similarity between the output data and the representation in the episodic memory; and deriving an episode loss function based on the similarity, wherein the feature vector is generated by inputting the training dataset into a pretrained deep neural network and includes a plurality of numerical elements, wherein constructing the episodic memory, obtaining the output data, deriving the similarity, and deriving the episode loss function are repeated a plurality of times during training to iteratively update one or more parameters of the artificial intelligence model using backpropagation based on the episode loss function and an optimization algorithm, and wherein, after each iteration of the training, the computer program is configured to update the feature vector stored in the full memory by:

inputting at least a portion of the training dataset into the artificial intelligence model after the one or more parameters are updated to generate updated output data;

generating an updated feature vector based on the updated output data; and storing the updated feature vector in the full memory in association with the training dataset prior to constructing the episodic memory for a next iteration of the training.

* * * * *